MAGNETIC RECORDING AND REPRODUCING

Filed Sept. 27, 1947

INVENTOR.
O. KORNEI
BY [signature]
ATTORNEY

March 17, 1953 O. KORNEI 2,631,855

MAGNETIC RECORDING AND REPRODUCING

Filed Sept. 27, 1947 3 Sheets-Sheet 2

INVENTOR.
O. KORNEI

BY M. Pinkes

ATTORNEY

INVENTOR.
O. KORNEI
BY [signature]
ATTORNEY

Patented Mar. 17, 1953 2,631,855

UNITED STATES PATENT OFFICE 2,631,855

MAGNETIC RECORDING AND REPRODUCING

Otto Kornei, Cleveland Heights, Ohio, assignor to The Brush Development Co., Cleveland, Ohio, a corporation of Ohio Application September 27, 1947, Serial No. 776,523

2 Claims. (Cl. 274—4)

This invention relates to magnetic transducing and more specifically to magnetic transducing arrangements utilizing record members which can be used for automatically producing any desired operating steps.

Among the objects of the invention are novel magnetic record tracks to selected portions of which are detachably adhered signal elements that can be used for automatically controlling transducing operations.

Another object of the invention is novel magnetic transducer arrangement having automatic operating features controlled by the signal elements of the above record track.

The foregoing and other objects of the invention will be best understood from the following description of exemplifications thereof, reference being had to the accompanying drawings, wherein.

Magnetic recorders and reproducers are, in general provided with record tracks of fixed lengths and difficulties are experienced in usng such apparatus with recording sequences having different lengths. At the present time, home type magnetic recorders are made with record tracks long enough to hold and play back thirty minutes or more of recording. These record tracks are wound on a reel in coil form and are operated by anchoring the outer end of the coil to another empty reel on which it is wound, thereby unwinding from the storage reel. The reeling is so arranged as to bring the moving record track into magnetic linkage with a transducing head.

Many forms of home entertainment numbers are short selections of about five minutes' duration, such as popular songs, arias, speeches, etc. An attempt to record and play back such short sequences poses several problems. If recordings are to be made without severing the record track into lengths required for the individual sequences and separately storing these lengths on different reels, it becomes necessary to provide an arrangement whereby a multiplicity of sequences are consecutively recorded on a single record track. When it is desired to play back one of these sequences the record track must first be reeled to the position occupied by the desired recording. If the desired recording is not the first sequence recorded at the beginning or outer end of the reel, the proper position cannot, in general, be determined without setting the apparatus for playback and listening to the recordings until the correct one is identified. Furthermore, home type as well as commercial recordings usually have varying durations so that a single thirty minute record track may, for example, have a sequence of several five minute recordings together with other recordings varying in length from one to ten or more minutes. This makes it impossible to select the desired recording even though its numerical position on the reel is known without listening to the playback as described above.

According to the invention, a magnetic record transducer is arranged so that individual recording sequences on a continuous elongated record track are spaced and marked by detachable adherent signal elements, and the signal elements are arranged to automatically control record track impelling operations to quickly bring any desired sequence in position for transducing without any attention on the part of the operator.

Figures 1, 2:
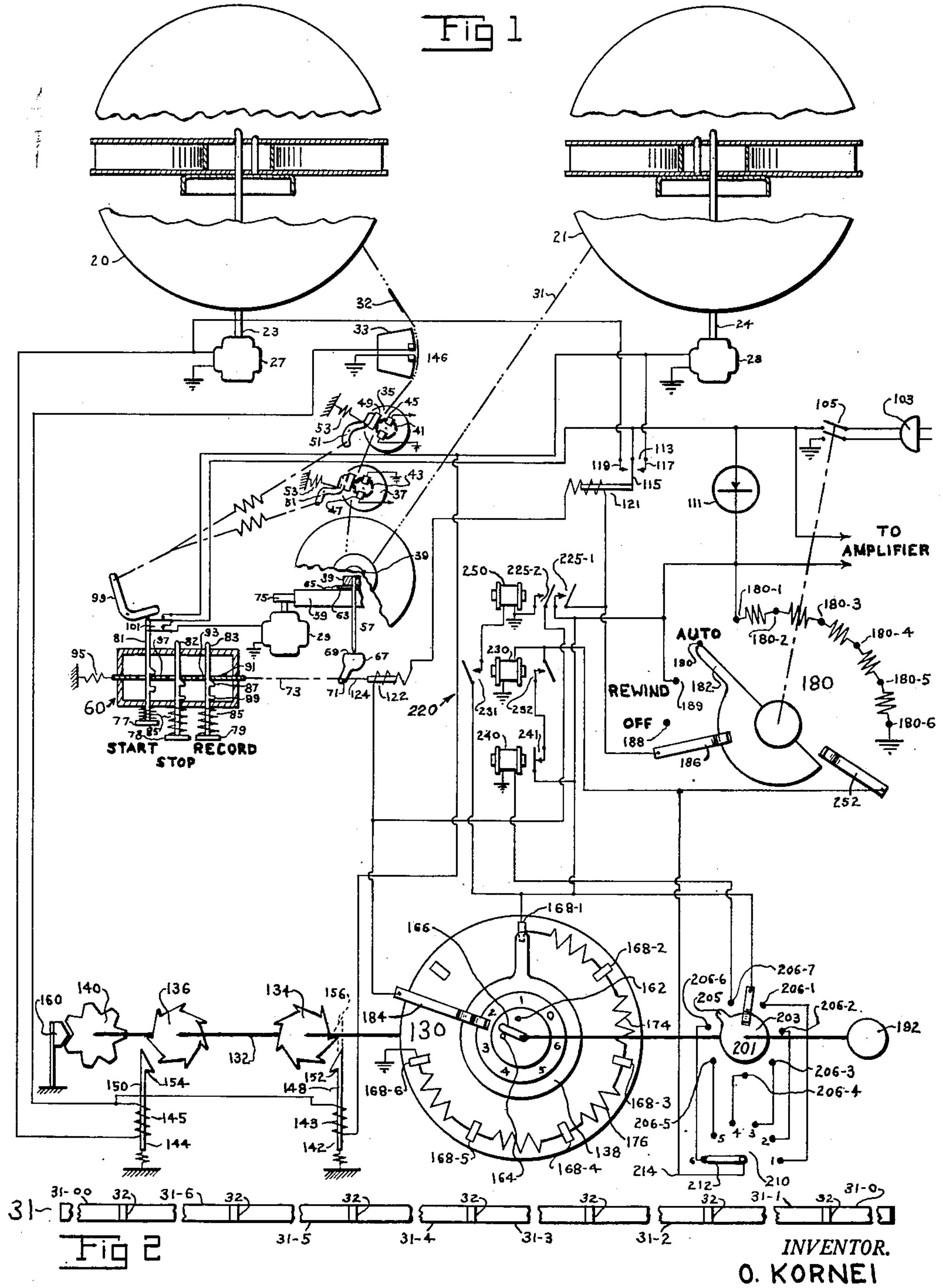
Fig. 1 shows in simplified schematic form the general arrangements and features of a magnetic record transducing system of the invention.
Fig. 2 shows a novel magnetic record track embodying the invention.

Fig. 1 schematically shows in simplified form one embodiment of a magnetic record transducer exemplifying the invention. A pair of record track holders 20, 21 in the form of reels are shown as rotatably mounted on a shaft 23, 24 which may be impelled by the motors 27, 28. An elongated permanent magnetizable record track 31 is shown as having one end held on reel 20 which may be used as a supply reel for record track storage, the other end of the record track being anchored to the hub 29 of reel 21. The length of record track 31 between the reels 20, 21 is threaded over a control and guide member 33, a magnetic erasing head 35, a magnetic transducing head 37 and a capstan roller 39 so that as the record track is unwound from supply reel 20 and wound onto take-up reel 21 the capstan roller 39 may be employed to impart a constant linear speed to the threaded portion of the record track while the magnetic heads 35, 37 perform the necessary transducing operations. The specific transducing arrangements of the magnetic heads 35, 37 as well as the transducing amplifier and switching arrangements form no part of the present invention and any suitable construction may be utilized, such as described, for example, in the copending Dank application, Serial No. 690,878, filed August 16, 1946, now Patent No. 2,535,486, issued December 26, 1950.

The record track 31 may be in the form of a tape comprising a stratum of dispersed finely divided permanently magnetizable powder particles, such as is disclosed in the prior Kornei applications, Serial Nos. 685,092 and 685,093, filed July 20, 1946, both now abandoned.

The magnetic heads 35, 37 contain magnetic cores 41, 43 and interlinked windings 45 and 47, respectively connected to an erasing means and the transducing amplifier as shown. A pair of pads 49 held on pad arms 51 may be provided to press the record track against the magnetic heads 45, 47 and thereby establish uniform magnetic linkage for proper transducing. The pads 49 may be of felt or similar material, the pad arms 51 being shown as pivoted and biased to retracted position as by springs 53. Operating linkage 55 is connected to each of the pad arms 51 for moving them into their pressing position under the influence of a control assembly 60.

The capstan roller 39 is shown as rotatably held on the capstan shaft 57 and frictionally engageable with a heavy flywheel 59 by sliding movement longitudinally to capstan shaft 57. A friction clutch disc 63 may be inserted between the capstan roller 39 and the flywheel 59 for providing suitable engaging and disengaging operations. The lower portion of capstan roller 39 may be extended radially to provide a flange 65 covering the friction disc 63 preventing the entrance of dust or other foreign particles which would interfere with proper clutching operation. In the form shown, the capstan shaft 57 is longitudinally slidable under the control of a cam 67 which may merely be a rotatably mounted shaft having a flat 69. The crank arm 71, such as a transversely bent portion of the shaft, is connected by link 73 with the switch control assembly 60 for biasing the cam 67 to the low position in which the flat 69 permits the capstan roller 39 and capstan shaft 57 to be lowered into frictional engagement with the flywheel 59. The capstan may be impelled by a third motor 29 driving a roller 75 which frictionally engages the outer rim of the flywheel. Switch control assembly 60, as shown, comprises a three button push button assembly of the conventional type in which any push button 77, 78, 79 operates a push rod 81, 82, 83 which may be inwardly actuated to hold itself latched in inwardly operated position. Upon inward actuation of any button into its operated position, such as shown for button 77, the other buttons are automatically unlatched and retracted to their outward inoperative position in which button 79 is shown under the influence of retracting springs 85. Each of the push rods 81, 82, 83 has mounted thereon a limit stop 89 and a latch cam 87 which coacts with a transversely slidable latch plate 91 cut away as indicated at 93 to permit penetration of the push rods. The latch plate 91 is biased as by spring 95 to urge wall portions 97 bordering the cut-outs 93 towards the corresponding cams 87. Inward operation of any of the buttons causes its associated push rod cam lobe 87 to slide the latch plate 91 sideways against the action of its bias 95. As the cam lobe passes through the cut-out 93 it releases the latch plate 91 which is immediately slid back to its latching position, shown, in which it holds the inwardly operated push rod latched and prevents its withdrawal. Two push rods may be simultaneously actuated into inwardly operated position if care is taken to assure that the rods intended to be latched inwardly are inwardly actuated at the same time. Any lack of synchronization will cause the later operated push rod to hold the latching plate 91 away from its latching position, thereby permitting retraction of the earlier operated push rod by its retracting bias 85.

The push buttons 77, 78, 79 are labelled, respectively, "Start," "Stop" and "Record." The Start push button 77 when inwardly operated acts to pivot crank lever 99 in counterclockwise direction simultaneously closing the contacts of switch 101 energizing the circuit for capstan motor 29. Such pivoting of the crank lever 99 pulls the pads 49 into pressing engagement with the magnetic heads 35, 37. A transducing operation is accordingly started, additional switch means being provided to control the operation of the transducing amplifier as is well known in the art.

Take-up motor 28 is shown as operated in parallel with the capstan motor 29 through another pair of contacts of switch 101 so that as the capstan feeds and impels the record track at the desired constant speed the reel 21 takes up any slack in the record track and keeps it in firm frictional engagement with the capstan roller. The surface of the capstan roller may be a friction layer such as a molded coating containing embedded friction particles, cork, for example. The take-up motor acts to directly take up the slack through the relatively long radius of the reel hub while the capstan motor impels the tape through the step-down pulley linkage and the relatively short radius of the capstan roller so that the capstan motor actuation is the principal force determining the record track speed even though both motors 28, 29 are of the same power output. The take-up motor is accordingly held down in speed by the capstan drive, the take-up motor being designed to allow for the resulting overheating.

Electric power for operation of the transducer is supplied through the connecting plug 103 which may be inserted in the conventional electric supply outlet fed by the standard A. C. power lines. "On-Off" switch 105 is provided to control the power supply and to energize A. C. bus line 107, as well as D. C. bus line 109, energized through the rectifier 111. The reel motors 27, 28 are connected for actuation by the A. C. bus line 107 through a high speed reeling control switch 113, having a blade 115 movable to engage either of a pair of contacts 117, 119 to close an impelling circuit to take-up reel motor 28 or supply reel motor 27, respectively.

The direction and actuation of the high speed reeling is controlled by a polarized relay 121 operated by a manually adjustable automatic control assembly indicated generally at 130.

The automatic assembly includes a counting unit having a rotatably mounted shaft 132 on which is held a pair of counting ratchet gears 134, 136, an indicator 138, and a notched retaining cam 140. One of the counting gears 134 is shown as arranged for clockwise rotation by a forward counting solenoid 142, the other counting gear 136 being correspondingly arranged for counterclockwise rotation by a rewinding counting solenoid 144. The solenoids 142, 144 include windings 143, 145 connected in parallel with the take-up and supply reel motors 28, 27, respectively. Inserted in the actuating circuit of the solenoid windings 143, 145 are a pair of counting contacts 146 on the control and guide member 33. The contacts 146 provide a gap in the counting solenoid operating circuits which is closed by the passage of a signal element on the record track 31 to send an actuating pulse through either of the solenoid windings 143, 145.

The counting solenoids 142, 144 also include armatures 148, 150 biased to the downward position in which they are shown and having their upper end shaped to provide pawls 152, 154 for cooperating with the counting ratchet gears 134, 136, in the inactivated position shown. The pawls 152, 154 are both held away from the counting ratchet gears 134, 136 so as to permit the rotation of shaft 132 in either direction. When a counting pulse is passed through one of the counting solenoids, such as the forward counting solenoid 142, the take-up reel motor 28 being energized and the record track being reeled in a forward direction, armature 148 is actuated to the extended position shown by the dotted lines at 156 during this outward travel of the armature, the pawl 152 does not engage the teeth of ratchet gear 134 but merely slides over them so that the ratchet and the shaft 132 is not rotated. As the signal element on the record track leaves the contacts 146, the counting impulse is terminated, the windings of the solenoids are deactivated and the raised armature 148 is retracted by its bias. In the retraction, pawl 152 engages a tooth ratchet gear 134 and rotates the gear and shaft through one advancing step. The two counting gears are arranged to be rotated in opposite directions by the counting solenoids and because of their independent connection in parallel to the separate reel driving motors 27, 28, the counting mechanism of the indicator unit 130 is advanced one step in the forward or clockwise direction each time a signal element of the record track passes the contacts 146 while the record track is reeled in the forward direction onto take-up reel 21 as impelled by take-up motor 28. Correspondingly, when the record track is being rewound onto supply reel 20 by operation of the take-up motor 27, the passage of a signal element to close the circuit between contacts 146, the counting mechanism is moved one step in the reverse or counter-clockwise direction.

The notched cam-shaped roller 140 cooperates with a centrally urged stop tooth 160 which catches in the notches between adjacent lobes of the roller and retains the counting mechanism in fixed position against any accidental or inadvertent turning forces. However, the retaining forces applying to the notched roller 140 are arranged to be easily overcome by the retracting movement of either of the counting armatures 148, 150.

The indicator plate 138 may be loosely held on the counting shaft 132 and provided with pins 162, 164 through which it is rotated by a small crank 166, arranged to rotate with the shaft 132. The pins 162, 164 are spaced by an amount sufficient to permit free movement of the crank arm 166 by one counting step so that a reversal of the counting operations permits the first counting impulse of the reversed signals to rotate the counting shaft 132 one step without moving the indicator plate.

As shown, the indicator plate may have a contact arm 168 moving across a row of contacts 168-1, 168-2, 168-3, 168-4, 168-5, 168-6 and 168-0. A printed row of indicating symbols may also be provided to be viewed through a window and present a number or other indication of the particular part of the counting sequence in which the mechanism 130 is set.

The contact arm 168 of the indicator plate is shown as arranged to cooperate with the row of contacts 168-1, 168-2, etc., as a potentiometer network by connecting the adjacent contacts with resistors 174 in the form of a chain 176 and providing another similar potentiometer chain 180 connected in parallel with the indicator chain and provided with a series of contacts 180-1, 180-2, 180-3, 180-4, 180-5, 180-6 swept by a dial arm 182.

The indicator plate arm 168 shown as connected to the dial arm 182 through lead contacts 184, 186 to form a bridge in which the circuit from one arm 182 to the other 184 is completed through the polarized solenoid 121, as well as the unpolarized solenoid 122. The potentiometer bridge is shown as energized from the D. C. bus 109, the circuits being completed by the ground connections shown.

The armature at unpolarized solenoid 122 may be connected by link 124 with the control link 73 so that it is biased toward the left-hand position in which it is shown, and when activated by current through its windings, the link 124 is pulled to the right-hand side causing operation of the capstan control 67 to disengage a capstan roller 39 from the flywheel 59, at the same time retracting the latch plate 91 of the push button assembly 60 to return the push button controls to inoperative position.

At the same time as the unpolarized solenoid 122 is operated, the series connected polarized solenoid 121 is also operated, but the direction of movement of the polarized armature depends upon the direction of current through the windings of the polarized solenoid 121. With the current flowing in one direction, the polarized armature moves in a direction to carry the switch blade 115 to establish a circuit with one of its opposed contacts, and with reversed current closes a circuit with the other.

As can be seen from the above, a record track 31 such as that shown in Fig. 2 holding a plurality of signal elements 32, spacing a series of individual recordings in the zones indicated at 31-1, 31-2, 31-3, 31-4, 31-5, 31-6 will be automatically operative for bringing a selected recording into position for transducing without any attention on the part of the operator.

In one form of the invention, where the record track 31 is in the form of an electrically nonconductive tape, as disclosed in the above mentioned Kornei application, the signal elements 32 may be electrically conductive members, such as short lengths of metal foil adherently united in the manner indicated. The metal foil signal elements may have a laminated structure in which a fibrous or paper sheet has a surface fixedly united to the foil and is coated with pressure-sensitive adhesive on its other surface so that it may be readily applied to the tape 31 where desired. The adhesive may be of the type that can be releasably adhered to the tape 31 so that the signal elements may be readily removed and relocated.

As shown in Fig. 2, the signal elements may be distributed along the tape 31 with the first signal element spacing a short distance from its outer end to leave a leader strip 31-0 which can be used for anchoring the record track on the take-up reel without removing the signal element from the threading path. The last signal element may also be correspondingly spaced from the end of the record track to leave a similar leader strip 31-00. The leader strips 31-0 and 31-00 have the additional function of permitting the reeling of the record track to continue for a short time after the last signal element that moves across the counting contacts, such as the contacts 146. This feature enables a transducing operation, for example, to be automatically followed by a rewinding operation without a complete unreeling and disengagement of the record track from the supply reel so that no additional anchoring operation need be performed.

Another operational feature of the leader strip 31-0, 31-00 is that high speed reeling operations can be more rapidly terminated by the braking action of the various elements of the transducer on the record track still remaining threaded along the path shown in Fig. 1 after the high speed impelling has been terminated. In the form shown in Fig. 1, for example, as the last signal element moves past the counting contacts 146 in a rewinding operation impelled by supply reel motor 27, with the apparatus set for automatically stopping and the capstan roller 39 disengaged from the capstan flywheel 59, a counting impulse is arranged to bring the indicator plate arm 168 to the position where the potentiometer bridges are balanced, solenoids 121, 122 are deactivated permitting the engaging bias 95 to return the capstan roller into engagement with flywheel and thereby apply a substantial amount of frictional drag to the leader portion of the record track as it moves in the threaded path in contact with the roller 39. In this way, the high speed rotation of take-up reel 20 can be appreciably slowed before the rewinding record track is completely removed from the take-up reel 21 and there is less tendency for the outer end of the record track to whip around the rapidly spinning reel and tear by engagement with nearby surfaces.

The apparatus shown in Fig. 1 is arranged for use with a unitary record track having six individual recordings, the counting gears 134, 136 each having seven teeth, the holding roller and the indicating plate having seven positions. The six contacts 168-1, 168-2, 168-3, 168-4, 168-5, 168-6 of the counting mechanism connected in chain form, as shown, are fed in parallel with a similar set of six contacts engaged by the control dial arm 182. For operation, a supply reel containing the record track shown in Fig. 2, for example, is mounted in place and the leader portion of the record track threaded through the transducing path shown and anchored to the take-up reel 21.

The control dial may then be set into any of the positions shown, such as position 180-3. The switch 105 which may be coupled for actuation and closing whenever control dial arm 182 is removed from an off position indicated at 188, thereby establishes the power supply. The bridge formed by the resistor chains 180 and 176 is in unbalanced position permitting D. C. to flow from the indicator contact arm 168 through contact lead 184, unpolarized solenoid 122, polarized solenoid 121, contact lead 186, and control dial arm 182. Unpolarized solenoid 122 is actuated pulling link 124 and operating the capstan control for disengaging the capstan roller 39 from the flywheel 59. Polarized solenoid 121 is simultaneously actuated pulling removable contact 115 of switch 113 to the left-hand or forward reeling position in which it engages fixed contact 117 and it establishes a feed circuit for impelling the take-up motor 28. The actuation of the solenoids also pulls the latch plate 91 of the push button assembly 69 to released position permitting all the control buttons 77, 78, 79 to return to the outward non-operative position so that both circuits of switch 111 stay open and the pressing pads 49, 48 are retained in the retracted position shown.

In this condition, operation of take-up motor 28 winds the record track upon the take-up reel 21 at a fairly high speed, the drag of the pressing pads and the capstan flywheel being absent. The high speed reeling continues rewinding the leader strip 31-0 from the supply reel followed by the first signal element 32. In passing the control guide 33, the first signal element generates a counting impulse which is fed to the forward counting solenoid 143 and causes its operation to advance the counting mechanism by one forward step. The counting shaft 132 is thereby rotated in clockwise direction, bringing the counting crank arm 166 away from rearward drive pin 164 and in contact with forward drive pin 162, the indicator dial remaining in position one, as shown, indicating by the characters on the dial 170 that the apparatus is reeling the record track through the first recording in the portion 31-1.

There being no change in the bridge network, the reeling continues. As the second signal element 32 is unwound and brought across the control guide 33, a second counting impulse operates a second forward counting step and the shaft 132 is thereby advanced carrying the indicator plate 138 one step in the clockwise direction. This brings the indicator plate contact arm 168 to the second position in which it engages contact 168-2. The potentiometer bridges are still unbalanced so that solenoids 121, 122 continue to be activated and the reeling proceeds without stopping. The indicator now shows that the second recording 31-2 is now being reeled. Passage of the three signal element produces a third counting impulse advancing the indicator arm 168 to the third position 168-3 which now balances the bridges and deactivates the solenoids 121, 122. Switch 113 is accordingly moved to the open position shown terminating the power feed to take-up 28, and the link 124 is released permitting the control bias 95 to return the capstan into engaged position, thereby causing the stationary flywheel 59 to apply a braking force to the rotating roller 39.

A similar reeling operation is effected when the control dial arm 182 is set to a position in advance of that indicated by the indicator plate arm 168. In this case, however, the polarized solenoid 121 moves the switch arm 115 in the opposite direction to engage its contact 119 and energize the supply reel motor 27. A relatively low friction rewinding operation is thus performed at a high speed until the indicator arm 168 is stepped back far enough to balance the bridge. When rewinding after a forward reeling operation, the first rewind counting step merely moves the counting crank 166 back from forward drive contact with pin 162 to rearward drive contact with pin 164. The second and succeeding rewind counting impulses step the indicator arm 168 back.

Playback of the recording on section 31–3 of the record track can now be effected by merely moving the Start push button 77 to the inwardly operated position shown in which it latches itself, closes the contacts of switch 101, and rotates the pressing pad actuating lever 99. The record track is held in stable magnetic linkage with the magnetic cores 41, 43 and the contacts of switch 101 energize the take-up reel motor 28 together with the capstan motor 29. Inasmuch as the capstan is retained in engaged position, the solenoid 122 being inoperative, the playback operation proceeds in conventional manner.

If a recording operation is to be performed instead of a playback, both the Start and Record push buttons are simultaneously moved to their inward positions. The same reeling action is effected by such control operation, but the record push rod 83 may be provided with additional switches which it operates when inwardly actuated to change the transducing action from playback to recording.

Once started, any transducing action will continue itself automatically until a signal element 32 passes the control guide 33. Such a signal terminals the transducing by advancing the indicator plate arm 168 to the next step and unbalancing the bridge arrangement. Solenoids 121, 122 become energized as in the rewinding operation described above until the record track is brought to the desired position after two rewind counting impulses. The first rewind counting impulse is caused by the passage of the same signal element 32 which indicates the termination of the transducing and the associated backward step of the counting mechanism merely moves the counting crank 166 without shifting the counting arm 168. The second counting impulse indicates that the beginning of the desired recording has been rewound and it is again ready for transducing. This time the indicator arm 168 is stepped backward to balance the bridge and high speed reeling is terminated.

It will be seen from the above that the apparatus of the invention, when set, will automatically bring any desired portion of the record track into position for transducing without any further attention on the part of the operator. This automatic action takes place in either forward reeling or a rewind reeling direction and the direction of reeling is automatically determined.

In the form shown, the seventh position of the counting mechanism 130 enables a series of different record tracks to be transduced without rewinding. Inasmuch as there are seven signal elements 32 employed to separate the record track into six record sections and two leader strips 31–0, 31–00, the indicator arm 168 will go through seven steps in each transducing sequence.

The Stop push button 78 is arranged so that when moved to this inward operated position it latches itself and releases the other push rods promptly stopping a transducing operation. The Stop push button may also be arranged to terminate the high speed reelings as by providing the shaft 82 with switches inserted in the energizing circuit of motors 27, 28.

A knob 192 is shown as mounted on counting shaft 132 for suitable adjustment of the indicator arm position, when necessary.

The control dial arm 182 may also be provided with additional settings shown by the contacts 189, 190 for different methods of operation, when desired. In position 189, which may be labelled Rewind, the control arm 182 is arranged to effect rewinding regardless of which of the recording regions are indicated by the counting mechanism 130. One way of doing this is shown in Fig. 1 in which the rewind contact 189 is merely connected to the contact 180–1.

The automatic setting 190 is arranged to provide an uninterrupted transducing of the entire record track. In the form of the invention shown, this sequence is automatically forwarded by a rewinding operation. In the position of contact 190, the control arm 182 is removed from the bridge circuit so that after a transducing operation is started by inward actuation of Start push button 77, the entire length of record track is transduced without actuating the circuit of solenoids 121, 122. An automatic rewind unit 201 shown mounted on the counting shaft 132 is provided for initiating the rewinding after a suitable number of counting impulses. As shown, the arrangement includes a rewind control disc 203 having a contact arm 205 sweeping over a series of rewind control contacts 206–1, 206–2, 206–3, 206–4, 206–5, 206–6, 206–7. The relative positioning of the rewind control arm and contacts may be shifted somewhat from the corresponding positions of the arm and contacts of the indicator plate 138 so that in any of the contact positions of the indicator arm 168 the rewind control arm 205 does not touch any of its contacts, but that during a counting step movement of the rewind control arm 205 to the next step causes it to momentarily engage one of its contacts in passing.

The rewind control disc 203 is shown as connected to the D. C. supply bus by contact brush 208, the series of contacts 206–1, 206–2, 206–3, 206–4, 206–5, 206–6 being connectible for energizing by a rewind network 220.

A single pole multi-position switch 210 has a moving arm 212 connected to the rewind initiating lead 214, and may be moved to connect this lead with any of the six contacts.

In the arrangement shown in Fig. 1, the rewind network 220 contains a locking relay 230, an unlocking relay 240, and a rewind relay 250. The locking relay 230 is shown as having two sets of contacts 231 and 232, the unlocking relay one set 241, and the rewind relay two sets 251, 252. The rewind initiating lead is shown as supplying the windings of the locking relay 230, the circuit being completed by the ground connections. The contacts 232 are connected in series through contacts in 241 of the unlocking relay 240 and provide a shunt feed from the D. C. bus through the windings of the locking relay 230. The contacts 231 establish a D. C. supply circuit to the windings of rewinding relay 250.

The windings of unlocking relay 240 are arranged for activation through the rewind control disc 203 and the rewind control contact 206–7. The rewind relay contacts 225–1, 225–2 are connected in circuits establishing a parallel feed from the D. C. bus through the solenoids 121, 122.

In operation, when the control dial 182 is set for automatic operation 190, and the record track has reeled its last signal element past the control guide 33, a counting impulse moves the counting indicator 168 to position 168–0, simultaneously carrying rewind control arm 205 past the contact 206–6. This establishes a momentary circuit from the D. C. bus through the windings of the locking relay 230 and closes its normally open contacts. The closing of contacts 232 maintains the energizing current through the windings of relay 230 through the normally closed contacts 241 of relay 240. The closing of contacts 231, maintained by the self-locking of relay 230, establishes an actuating circuit for the windings of rewind relay 250. Relay 250 is accordingly energized and maintained in energized condition.

Rewinding is thereby commenced by the energization of the solenoids 121, 122 through the rewind relay contacts 225–1, 225–2. The successive signal elements 32 of the record track will keep the counting mechanism 130 in step with the rewinding sequence and also carry the rewind control 201 along with it. The passage of the last signal sequence 32, indicating the completion of the rewind operation, will bring the rewind control arm 205 past the contact 206–7 to momentarily energize the unlocking relay 240 to open its normally closed contacts 241. The locking relay 230 is to be unlocked and opens the circuit energizing the rewind relay 250, permitting the rewind contacts 225–1, 225–2 to open and stop the rewinding. An additional brush lead 252 may be provided to insure that rewinding is initiated with the control dial 182 set to rewind portion 189 even when the counting mechanism is disengaged from the bridge circuit, as for example, when it is in position 188–0.

The switch 210 may be set to indicate the number of individual recordings on a unitary record track and when properly set will produce an automatic rewinding action after the last individual recording has been transduced. This switch 210 may also be operated to effect a complete rewinding of the record track after any one of the individual recordings has been transduced. For example, if the second of a sequence of six recordings is desired to be transduced after which a complete rewinding of the record track is to be performed automatically, the switch 212 is set at position two and the control dial 182 set at position 180–2. A threaded record track will then be rapidly reeled to the beginning of the second record zone 31–2 after which operation of the Start push button 77 will commence the transducing. When the transducing is completed and the signal element transmits the concluding counting impulse to the counting mechanism 130, the rewind control arm 205 will brush past its contact 206–2 momentarily actuating the locking relay 230. The relay 230 will then lock itself into actuated condition to establish a rewind operation as indicated above. This rewinding will be completed when the rewind control arm 205 establishes the circuit for actuating the unlocking relay 240 by passage of the outermost signal element past the control guide 33.

Other features of the invention will be evident from the above description. Refinements may be added for providing more efficient operation.

The apparatus may be provided with instructions to rotate the knob 192 counter-clockwise to arrest any undesired rewinding inadvertently initiated.

As another modification, the apparatus may be arranged so that reeling of any kind cannot be maintained unless a record track is threaded in place. This may be provided by a sensing member arranged to be actuated by the record track moving in the threaded path shown and operating a switch interposed in the power line.

It is evident that the solenoids 142, 144 should be of the A. C. power type if operated in parallel with A. C. reeling motors 27, 28. Also, the relays of the automatic relay control 220 may be connected for operation by the A. C. bus and may also be of the A. C. type.

According to a modification of the invention, the signal elements 32 may be arranged for assuring that the reeling is always controlled to stop with definite relation to the individual signal elements. For example, a reeling control impulse of the type employed for terminating a reeling operation, may be arranged to first reverse the reeling direction upon initial passage of the controlling signal element, then to terminate reeling when the same signal element is returning in the other direction. This makes it possible to eliminate the over-run usually produced when attempting to stop a high seed reeling operation. Furthermore, the reversal of the reeling direction acts to more rapidly decelerate the original reeling. The switch blade 115 may be arranged so that when retracted from either of its extreme operated positions, it closes a circuit for effecting a reversed reeling. The intervening reverse establishing contacts may be arranged to operate relays that are deactivated by the counting impulses. With the above arrangement, less of the record track need be devoted for merely spacing the individual signal elements and allowing for the over-run produced between the initiation of a counting impulse and the reeling cessation produced by that impulse.

Figure 3:
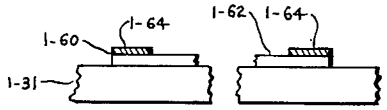
Fig. 3 is a sectional view of a portion of a modified record track of the invention.

According to a further modification, the signal elements may be supplied in pairs for simultaneous mounting between two adjacent individual recordings and the apparatus may be arranged to initiate a reeling cessation upon the passage of the first of the pair of signal elements and to terminate the reeling cessation when the second of the pair provides a signal impulse. As shown in Fig. 3, for example, the record track 1–31 may be provided with signal elements 1–60 of elongated form and comprising a strip 1–62 of electrically non-conductive material to opposite regions of which are adhered a pair of electrically conductive signal members 1–64. The strip 1–62 may have its lower surface coated with pressure-sensitive adhesive for simple application, removal, and re-application of the record track 1–31, wherever desired. In this manner, only a single signal strip is applied to provide the dual control signals described above for assuring the cessation of reeling at a definite and reproducible portion of the record track. For the latter modification, the movable blade 115 of switch 113 may be arranged to cause capstan engagement and pressure pad application upon the passage of the first signal element of the dual signal pair when the blade is being returned from either of its extreme positions. This applies considerable frictional drag on the record track movement and its reeling speed is greatly lowered. The passage of the second signal element of the dual pair may be arranged to de-energize the reeling motors so that the reeling, now quite slow, is immediately stopped.

With the latter two modifications, the counting mechanism 130 may be modified so as to properly indicate the reeled condition of the record track in conformity with the signal modification. According to a further phase of the invention, the signal elements 32 or 1–64 may be of the electrically non-conductive type. They may be surround by record track areas that are electrically conductive, as, for example, by using a metallic tape as a record track. The variations in physical characteristics may be arranged to generate a counting impulse for performing the desired control stops.

The passage of all the counting solenoid operating impulse currents through the signal elements of the tape may be avoided by inserting a suitable amplifier in the impulse output line so that only an exceedingly minute current is required to pass along any portion of the tape and sparking is substantially eliminated. A vacuum tube or other relay arrangement may be used as such an amplifying device.

According to a different embodiment of the invention, the signal elements may be arranged to change other physical characteristics of the record track at the desired signal zone. For example, the optical reflectivity or the dielectric constant may be varied by applying signal elements of highly reflective material to a record track of relatively low reflectivity, or vice versa. A thin metal foil on a black tape, or a black paper strip on a bright tape make suitable constructions.

Variation in the dielectric constant of the record track may be detected by placing one or more electrical conductors adjacent the record track threading path and using the capacitance between the conductors or between one conductor and the record track to control a signal impulse circuit.

In general the record tracks of the invention may have signal elements suitably dimensioned to provide the desired signal pulses. The signal pulse duration should be sufficient, considering the actuating requirements of the counting solenoids to provide sharp and prompt action. For example, signal element lengths of the order of half a foot or more are suitable for providing the desired action under extremely high speed reeling conditions. Shorter lengths are satisfactory, however, especially where the fastest reeling speeds are not desired.

Figure 4:
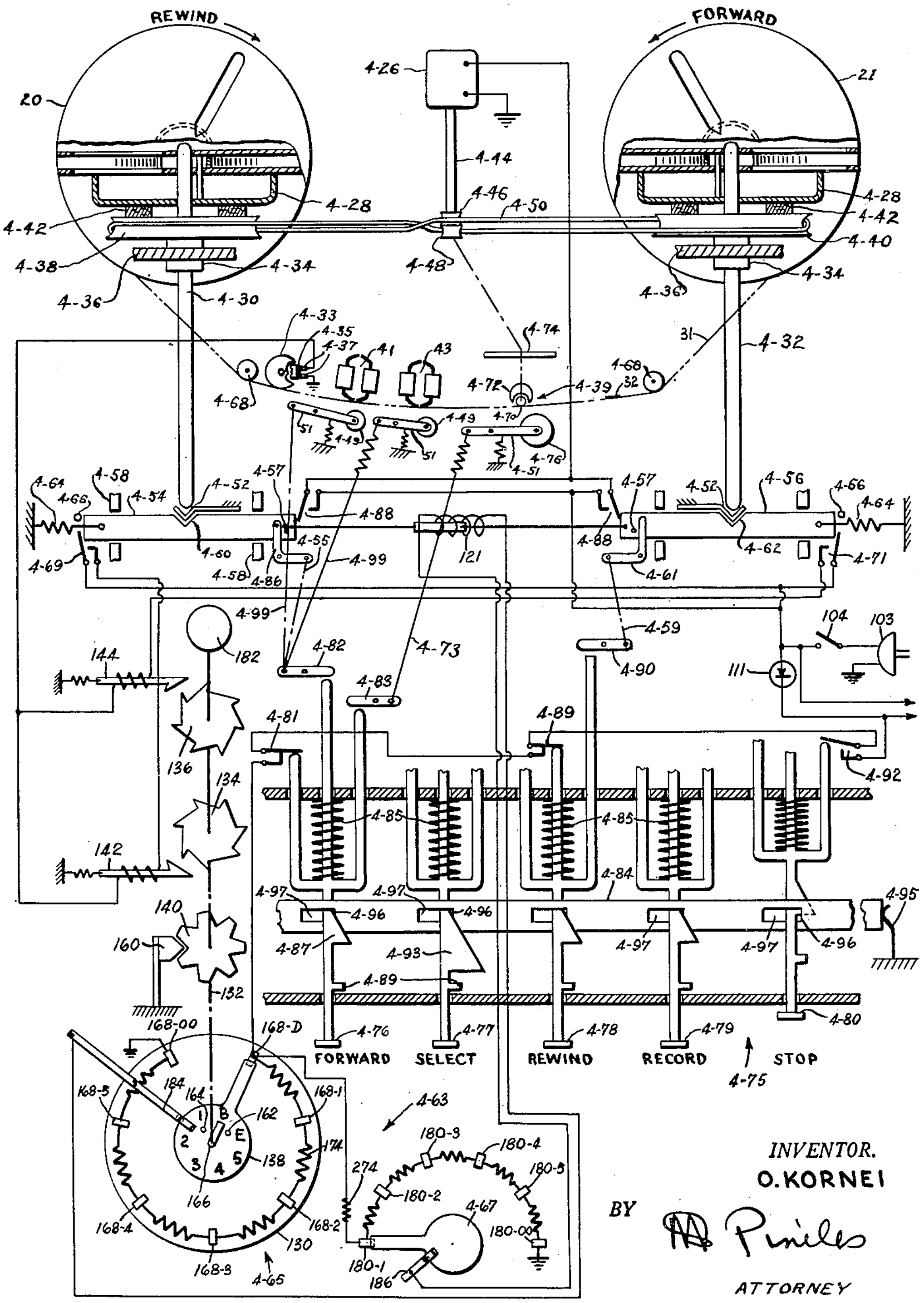
Fig. 4 is a schematic view similar to Fig. 1 of the essential elements of a simplified magnetic record transducer embodying the invention.

Fig. 4 is a simplified diagrammatic view of a streamlined embodiment of the invention. The essential features of the automatic selector are incorporated in this embodiment in a manner similar to that shown in the construction of Fig. 1. A magnetic record track 31 is shown as arranged to be moved in a forward direction and wound on take-up reel 21 as it is unwound from supply reel 20. These reels may be identical with those shown in Fig. 1, but are here illustrated as driven by a single motor 4–26 which supplies all the necessary record track impelling functions.

In the form shown, the reels are held on dished tables 4–28 supported by reel drive shafts 4–30, 4–32 for the respective supply and take-up reels. The shafts are each journaled in bearing members 4–34 in which they are also vertically slidable. The bearing members 4–34 may be securely held on a supporting wall, portions of which are shown at 4–36, and also rotatably receive pulleys 4–38, 4–40. The reel tables 4–28 are arranged to be biased toward the surface of the respective pulleys 4–38, 4–40 as by their own weight and an interposed friction member, such as a disc 4–42 of felt or similar material establishes a friction clutch drive between the respective pulleys 4–38, 4–40 and the supply and take-up reels 20, 21 through the reel tables.

The reel tables are normally positioned in the frictionally engaged position shown in Fig. 4, but the frictional engagement to either reel may be broken by lifting the corresponding reel shaft 4–30, 4–32, thereby permitting the other frictionally engaged pulley to impel the record track in the desired direction.

The impelling motor 4–26 is shown as arranged to simultaneously drive both pulleys 4–38, 4–40 in opposite direction so that the movement of the record track in either forward or rewind direction may be easily obtained with an impelling motor rotating in only one direction by disengagement of the friction clutch drive to either reel. In the form described, the impelling motor 4–26 has a shaft 4–44 on which are mounted two reel driving pulleys 4–46, 4–48. A single drive belt 4–50 is looped around the two reel pulleys 4–38, 4–40 and at an intermediate region it is twisted to provide a crossover so that impelling of the belt in one direction will simultaneously rotate in opposite directions the reel pulleys 4–38, 4–40. The motor shaft pulleys 4–46, 4–48 which may be placed closely adjacent each other are arranged to respectively engage opposing arms of the drive belt 4–50 as by so mounting the motor 4–26 that the motor pulleys 4–46, 4–48 are wedged in a loop of the drive belt adjacent the crossover point. Each of the opposing arms of this loop of the belt are thereby urged into contact with the different motor pulleys spaced to allow for the spacing of the belt arms by the crossover twist.

For operation of the reel friction drives there is shown a selective reel shaft lifting arrangement including shaft sockets 4–52 and slide bars 4–54, 4–56. The slide bars 4–54, 4–56 are guided by slide guides 4–58 and are provided with pockets 4–60, 4–62 respectively for receiving shaft sockets 4–52 which may be made of spring material biased downwardly toward the pockets as shown. The slide bars are also shown as biased toward the outer clutch engaged positions by the bias springs 4–64. Stops 4–66 may be adjusted for limiting the outward travel of the slide bar to assure that when not operated the shaft sockets 4–52 are received in pockets 4–60, 4–62 and the downward reel shaft bias establishes friction contact between the reel table and pulley.

Inward movement of either of the slide bars is accordingly arranged to flex the shaft sockets 4–52 upwardly from their respective pockets 4–60, 4–62 to cause elevation of the corresponding reel shaft 4–30, 4–32 and disengagement of the associated reel table 4–28 from contact with the reel pulley.

The record track 31 moves in a reeling guide path between the supply reel 20 and take-up reel 21. The guide path is defined by guide surfaces, such as the rollers 4–68, sensing member 4–33, magnetic erasing core 41, magnetic transducing core 43 and capstan drive 4–39. The sensing member 4–33 may be in the form of a roller having a spaced pair of contact rings 4–35 against which are held contact brushes 4–37.

The erasing and transducing cores 41, 43 may be of any suitable type, such as those shown above and may also be provided with pressing rollers 4–49 pivotally held on arms 51 and operated in a manner similar to that described in connection with Fig. 1.

The capstan drive 4–39 is shown in this form of the invention as including a thin roller 4–70 rotatably mounted against a backing support 4–72 and driven by the impelling motor 4–26 as by a belt and pulley arrangement or by merely forming it as an extension of the motor shaft. The capstan roller 4–70 is provided with a flywheel 4–74 for supplying suitable rotational inertia. The record track 31 may be freely moved over the surface of the capstan roller 4–70 without developing enough frictional driving contact with the capstan roller to appreciably affect the record track movement. However, a pinch roller 4-76 rotatably mounted on a pivot arm 4-51 is arranged to press the record track against the capstan shaft 4-70 as by retraction of the capstan control link 4-73. When so pressed against the capstan roller 4-70, the record track 31 is held in stable and firm frictional contact and its movement is controlled by the rate of rotation and the capstan roller. With the arrangement described, the capstan drive may be easily applied or disconnected as desired. The capstan drive arangement shown forms no part of the present invention and is more completely described in the copending Williams application, Serial No. 732,970, filed March 7, 1947, now Patent No. 2,493,632, issued January 3, 1950.

By merely disengaging the friction driving connection from one of the reel pulleys 4-38, 4-40, the belt 4-50 will be caused to remain in frictional driving contact with a selected reel for winding the record track 31 in the desired direction. In operation, the reel driving motor 4-23 impels the selected reel directly through belt 4-50 and with the capstan drive disengaged, rotates the reel fast enough to wind-up the record track 31 at a speed greatly in excess of that used for recording or playback, in a manner similar to that shown in connection with the construction of Fig. 1. When the capstan drive is engaged as by retraction of the capstan control linkage 4-73, the relatively thin capstan roller 4-70 will impel the record track through a small driving radius and hence with a much greater mechanical advantage than is possible through the forward impelling reel shaft pulley 4-40. The movement of the record track will accordingly be controlled primarily by the capstan drive, the direct reel drive functioning merely to take-up any slack between the capstan and the take-up reel 21. The low torque driving engagement with the record track through take-up reel pulley 4-40 and take-up reel 21 will slip at the friction engagement with friction pad 4-42 and/or at the belt 4-50 permitting high quality constant speed record track reeling.

Operation of the apparatus of Fig. 4 is shown as controlled from a bank of push button switches 4-75 which may be arranged as shown to include a set of five interlocked switches of the push button type 4-76 to 4-80, bearing a suitable legend for indicating the function controlled. Actuating power may be supplied from conventional sources, such as the commercial 60 cycle A. C. electric power lines through plug 103 and On-Off switch 104. Push button 4-76 which carries the legend Forward includes extensions arranged for operating automatic selector switch 4-81 as well as a pair of reeling control levers 4-82, 4-83. Push button 4-76 is shown as interlocked with the other push button through latch cam 4-87 and sliding latch plate 4-84 biased toward latching engagement as by a spring 4-95. Retracting spring 4-85 and stop 4-89 control the push button movement in the housing of the push button bank.

Forward push button 4-76 is shown in Fig. 4 in the outward non-operated position from which it can be readily pushed inward manually to its operated position in which it is held by a wall 4-96 bounding a cam receiving opening 4-97 of the latch plate, as shown, for example, by the push button 4-80. When inwardly operated the Forward push button opens the selector control switch 4-81, applied the capstan engagement by operation of control lever 4-83 and completes a forward transducing control by operating control lever 4-82. A link 4-55 connected to the forward control lever 4-82 rotates a pivotally mounted clutch operator 4-86, an arm of which engages pin 4-59 on supply reel slide bar 4-54 disengaging the supply reel clutch and closing reeling switch 4-88 in the energizing circuit of reeling motor 4-26. The record track is accordingly impelled in forward direction at the transducing speed determined by the capstan rod 4-39. At the same time, additional links 4-89 cause the forward control lever 4-82 to bring the pressing members 4-49 in pressing engagement with the pole face portion of magnetic cores 41, 43 to hold the record track stable in magnetic linkage therewith.

The inward operation of the Forward push button 4-76 also causes its cam 4-87 to momentarily slide latch plate 4-84 to the right unlocking any of the other push buttons that may have been latched in inwardly operated position.

Operation of push button 4-78 which bears the legend "Rewind" similarly unlocks and permits retraction of any other push buttons and, in addition, opens another automatic selector control switch 4-39 and operates rewind control lever 4-90. Link 4-59 connected between the rewind control lever 4-90 and take-up reel clutch lever 4-61 initiates a rewinding through a pin 4-57 on slide bar 4-56 and an additional motor energizing switch 4-88 in parallel with the other motor energizing switch in a manner similar to the forward reeling. Push button 4-80, which may bear the legend "Stop," is shown in the inwardly operated position, and is also interlinked with the push button assembly to cause the retraction of any other inwardly latched push buttons and to also open a third automatic selector control switch 4-92. The retraction of any inwardly latched reeling control push buttons releases the slide bars 4-54, 4-56 so that they are retracted to the biased position shown permitting the motor energizing switches 4-88 to open and at the same time causing frictional engagement of both supply and take-up reel rotation and record track movement.

The push button 4-79 which is labelled "Record" may merely be arranged to switch the amplifier assembly associated with the magnetic transducer from a playback to a record connection as by associated switches when the button is moved from the retracted position shown to the inwardly operated position. This is a safety feature which prevents inadvertent recording of one program over another since recordings cannot be effected unless both the Forward and Record push buttons 4-76, 4-79 are moved to the inwardly operated position at the same time. Any discrepancy in the simultaneous manipulation of the Forward and Record push buttons as, for example, when the Record push button is accidentally operated while the apparatus is in forward reeling operation, will cause the later operated push button to unlatch and permit release of the earlier operated push buttons so that recording is impossible.

The push button 4-77 which is labelled "Select" is shown as similar to the other push buttons, containing retracting spring 4-85 and stop 4-89. Its cam, however, is arranged for unlocking the latch plate 4-84, but does not itself become latched in inwardly operated position. As shown, cam 4-93 is prolonged outwardly so that in its innermost operating position it does not penetrate the corresponding latch plate opening 4-97 sufficiently to be held by the latch wall 4-96. By unlatching the other push button controls, Select push button 4-77 permits the three selector control switches 4-81, 4-89, 4-92, connected in series, to be simultaneously closed, completing the supply path from the On-Off switch 104 through rectifier 111 to the automatic selector assembly 4-63.

The automatic number selector 4-63 is a simplified embodiment of the invention including a counting unit 4-65, a manual selector 4-67, counting ratchets 134, 136 and counting solenoids 142 and 144. As described above in connection with Fig. 1, the counting indicator 4-65 comprises a plate 130 carrying a set of contacts 168-0, 168-1, 168-2, 168-3, 168-4, 168-5, 168-00 and a rotatable indicator dial 138, an arm of which is arranged to engage the contacts as it is rotated. A crank 166 is fixed on shaft 132 which carries the counting rachets 134, 136 and a pair of pins 162, 164 are fixed on the indicator dial 138 so that as either of the ratchets is advanced by its associated counting solenoids 142, 144 it rotates the indicator dial by a corresponding step and a one step lag is injected at every reeling reversal.

As shown, the counting solenoids have their windings connected through forward counting switch 4-69 and rewind counting switch 4-71 with the power source, the circuit being completed through the brush contacts 4-37 of the sensing member 4-33. Upon the passage of a conductive signal element 32 on record track 31 similar to those described in connection with Figs. 2 and 3, for example, along the reeling guide path, it momentarily closes the circuit between the contact rings 4-35 of the sensing member and one of the counting solenoids 142, 144 depending upon which of the counting switches 4-69, 4-71 is closed by one of the slide bars 4-54, 4-56 in the corresponding clutch disengaging position. The momentarily actuated solenoid winding causes projection of its armature toward the corresponding counting ratchet followed by retraction of the armature, the toothed end of which advances the ratchet one step.

A restrainer in the form of a gear 140 and resiliently held meshing tooth 160 may be provided for assuring that the indicator arm is securely held against inadvertent and improper rotation. A manual control knob 182 permits proper setting of the indicator dial when necessary.

A series of resistors 174 is connected between adjacent contacts 168-0, 168-1, 168-5, and 168-00, to operate as arms of a self-balancing resistance bridge in conjunction with the manual selector 4-67 which contains a similar set of contacts 180-1, 180-2, 180-3, 180-4, 180-5, and 180-00 also spaced by resistance steps. An additional resistor step 2-74 is inserted in the resistor chain of selector 4-67 and both chains are connected in parallel and are shown as fed by the D. C. output of rectifier 111, the circuit connections being completed by the ground connections shown. The variable arms of the resistance bridge formed by the rotatable dials 138 and 4-67 supply energy through contact arms 184, 186, respectively, to the polarized control solenoid 121 linked to both friction drive slide bars 4-54, 4-56 in the manner shown.

The polarized solenoid 121 is so arranged that any unbalance between the positions of the automatic counting indicator 4-65 and the manually set selector 4-67 feeds the solenoid windings with an electrical current of such polarity as to attract the solenoid armature in a direction which pulls the proper drive disengaging slide bar 4-54, 4-56 and initiates a reeling operation for correcting the unbalanced condition.

Accordingly, with an elongated record track containing five different recordings spaced along its length and separated by signal elements removably adhered, if it is desired to play back the fifth recording, it is merely necessary to mount the record track on supply reel 20, thread the track along the guide path, as shown, and place the manual selector in position five in engagement with contact 180-5. Upon closing the On-Off switch 104, and operation of the Select push button 4-77, the counting indicator being in a position shown, the resistance bridge will be unbalanced and the polarized solenoid 121 will pull the supply reel slide bar 4-54 to the right disengaging the drive connection to the supply reel, energizing the reeling motor 4-26 and closing the forward counting switch 4-69. Forward reeling of the record track is accordingly initiated and inasmuch as the capstan drive 4-39 and the pressing members 4-49 are not operated the forward reeling takes place at a relatively high speed. As each identifying removably adherent signal element on the record track moves past the sensing member 4-33, the Forward counting solenoid 142 is momentarily operated keeping the indicator dial 138 in step with the recorded sections of the record track. When the fifth section of the record track is reached, indicator arm 138 is brought into engagement with contact 168-5 balancing the bridge and de-energizing the polarized solenoid 121. The retracted slide bar 4-54 is thereby released, opening the energizing circuit for the impelling motor 4-26 and frictionally connecting the supply reel 20 to the belt 4-50, causing a considerable brake to be applied to the tensioned record track 31 and promptly stopping the fast forward reeling.

The apparatus is now ready and actuation of Forward push button 4-76 will initiate the desired playback operation. The entire automatic selection operation takes only a short time and requires no attention. Similar automatic selection takes place with any other setting of the manual selector 4-67 and with any other starting positions of the record track.

Contact 180-00 on the selector mechanism enables a complete automatic forward reeling of the record track if it is desired to rewind the record track or to mount it all on the take-up reel after a number has been transduced for example.

The reversing lag injected by the injector crank 166 and spaced pins 162, 164 assures the proper balancing and termination of an automatic selection step involving and rewinding only after the record track is brought to the beginning of the selected portion of the track. For example, the fifth number has been completely transduced the sixth signal element will be reeled through and the dial 138 will be at contact 168-00. If the automatic selector is now again set at the fifth number at contact 180-5 and energized, rewinding will commence and the sixth signal element will be immediately reeled back past the sensing member producing a counting pulse in the rewind solenoid 144. The crank lag permits the indicator dial to remain stationary during this counting pulse and to be moved by the fifth signal indicator to balancing position adjacent the beginning of the fifth record track section. In the absence of the crank leg the balancing would take place upon passage of the sixth sensing element at the end of the fifth record track section.

The self-balancing bridge networks described in the above forms of the invention are only one of a number of types of similar arrangements that may be used. Thus, for example, instead of using the current through the resistor chains for directly actuating the reeling operations, an amplifying arrangement such as the vacuum tube balancing system shown in U. S. Patent No. 1,960,350 may be substituted. Furthermore, the bridge may be operated by unrectified alternating current supplied directly from the power source. In this case the amplifier may be suitably modified for proper operation as by using vacuum tubes having their plates fed by the same A. C. power to determine whether the differential A. C. signal input from the bridge taps tends to make the vacuum tube input grid more positive or more negative than the cathode during a positive plate supply half cycle, and therefore whether the tap on one bridge chain is at a higher or lower A. C. potential than the tap of the other chain.

According to a further form of the invention, the signal-element-containing magnetic record track transducer, as described above in connection with Figs. 1 to 3, is combined with a slide viewing apparatus and arranged so that each time a signal element moves across a sensing portion of the record track guide path the slide viewing apparatus is caused to advance one step and project the next slide of a sequence.

Figure 5:
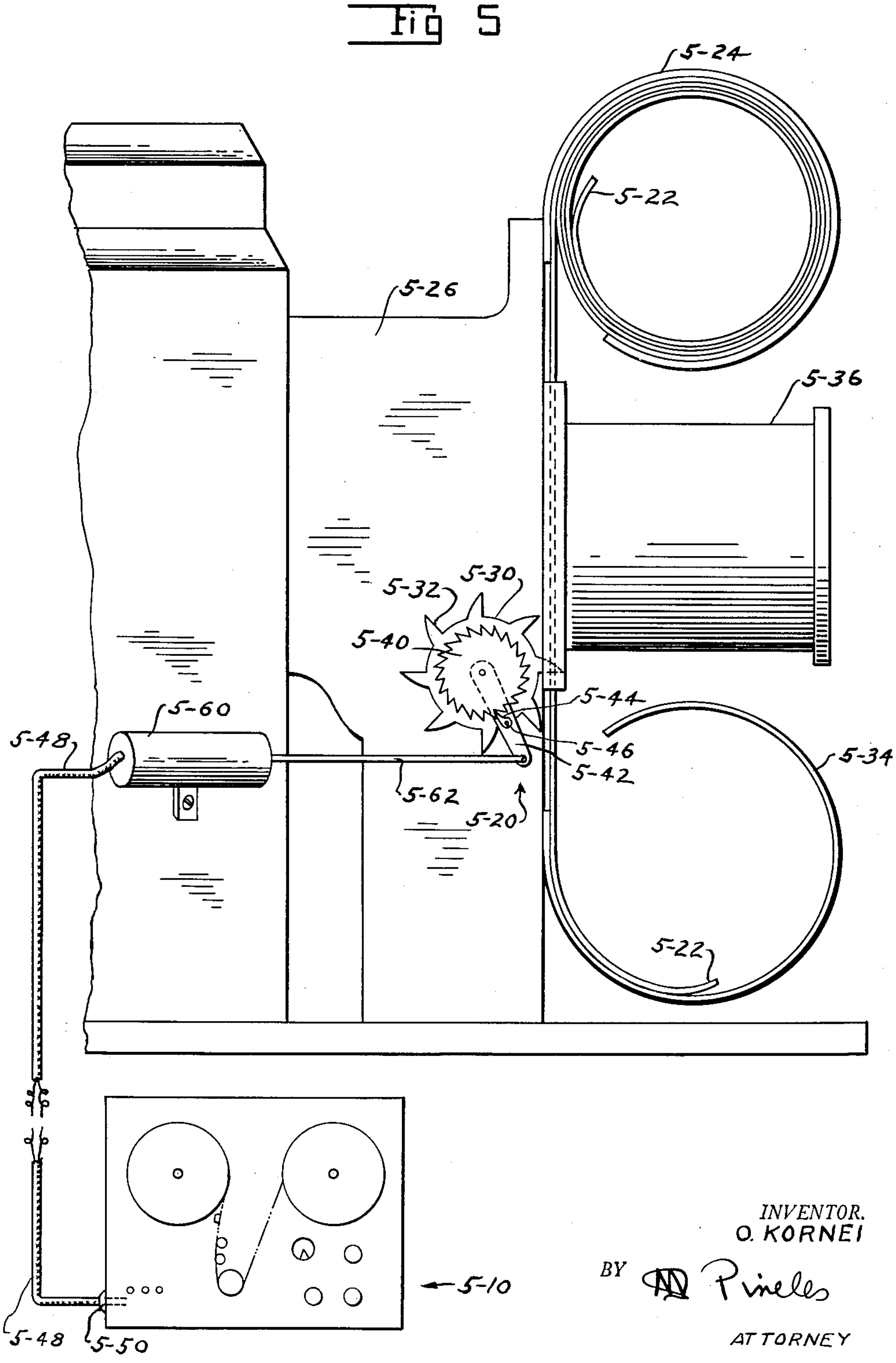
Fig. 5 is a combined magnetic record transducer and film projector according to a further phase of the invention.

Fig. 5 shows one example of this form of the invention. As here shown, the magnetic transducer 5–10 which may be of the type shown in Fig. 4 is combined with a film projector 5–20 in which a roll of film 5–22 may be placed in a holder 5–24 and intermittently advanced through a film gate assembly 5–26. The film is shown as fed by a rotatable sprocket 5–30 having teeth 5–32 which engage in sprocket holes in the film margin and pull the film through the gate so that the individual picture frames positioned in the path of the projecting light beam are advanced by one step. As the film emerges from the gate it moves into a curved holder 5–34 where it automatically coils itself up and from which it is readily removed. The lens system in the lens holder 5–36 cooperates with projection light to provide the desired image.

Advancing of the film is, in the form shown, automatically arranged by mounting a ratchet gear 5–40 on the sprocket 5–30 and pivotally holding a pawl arm 5–42 carrying a pawl on a pin 5–46 biased toward engagement with the ratchet teeth of ratchet gear 5–40. The pawl arm is connected for operation from the magnetic record transducer 5–10 as by the electrical cable 5–48 which may have a plug 5–50 for fitting into a suitable jack on the body of the record transducer. The other end of the cable 5–48 is connected to an advancing solenoid 5–60, the armature of which is biased to the outer position as shown at 5–62 and is linked to the pawl arm for operation of the film feed. The current supplied to the windings of the advancing solenoid may be the amplified or unamplified signal impulses passed by the individual signal elements on the record track as they move past the sensing member.

Provision may be made for stopping the magnetic record transducing action in the event of the improper operation of the film projector. For example, the counting impulses may be arranged to open the transducer reeling supply circuits as by means of a relay, and a sensing circuit connected to the projector may be arranged to close the reeling supply circuits as by another relay when a film advancing step is successfully completed. The sensing circuit may be conveniently provided with contacts which are closed by engagement with the solenoid armature when it reaches its fully operated position. Alternatively, the projector may have an additional sprocket engaging the film above the film gate and momentarily closing a sensing circuit each time the sprocket is rotated by a film advancing step. Any slight pause in the magnetic record transducer operation injected by the intercontrol arrangement will not be objectionable inasmuch as it is advisable to have no signal or silent zones immediately following the film advancing step. The presence of the silent zones may be assured by placing the signal elements on the magnetizable stratum of the record track so that it separates the stratum from the magnetic transducing head. The signal elements may include a layer of highly permeable magnetic material, such as a soft iron ribbon, to effectively shield the covered permanently magnetizable record track portion from the head.

As another modification of the invention, the film projector is of the double projection type in which two projection apertures are alternately operated and the individual film frames advanced between projections so that the projected pictures change sharply instead of gradually with the accompanying optical annoyance of seeing the projected pictures move across the screen. This type of projector, as shown in U. S. Patent No. 2,395,883, for example, may be arranged for operation by the magnetic transducer in the manner described above in connection with Fig. 5.

With the coordinated sound reproducer and picture projector of the invention it is for the first time possible to simply and conveniently prepare illustrated lectures or similar programs. It is only necessary to examine the subject matter of the film frames, operate the magnetic record transducer for recording and read the comment on the individual frames into the recorder microphone. After the comment of each frame a readily attachable and detachable signal element of the invention is suitably applied to the record track and the comment on the next frame begun.

The convenience of the magnetic recording technique is heightened by the ease with which the signal elements may be applied, adjusted or removed. The record track of the invention may be played back thousands of times and may be re-used for different films by merely making a different recording and adjusting the positions of the signal elements to suit.

The magnetic record tracks of the invention may be of the tape or filamentary form as described above or may be of the extended surface type. In one form of these extended surface types a large loop of plastic sheet record material encircles and is guided over a generally smaller impelling roller having its axis horizontal so that most of the loop hangs down freely. A pinch roller may be mounted to hold a portion of the roller-contacting loop in firm driving engagement with the roller to revolve the loop.

The plastic sheet may be provided with grooves to guide a magnetic transducing head along the record track path of the loop, as by fixing a stylus to the head placed above the roller and fitting the stylus into a groove.

The signal elements of the invention may be readily applied to and removed from the extended surface of the sheet and the guide grooves used as locating and reference marks. The permanently magnetizable material may be incorporated in the sheet in accordance with the teachings of the copending Kornei applications: Serial No. 685,092, filed July 20, 1946, now abandoned; Serial No. 685,093, filed July 20, 1946, now abandoned; Serial No. 762,464, filed July 21, 1947, now abandoned; Serial No. 762,463, filed July 21, 1947, now Patent No. 2,547,948, issued April 10, 1951.

Other extended surface record members, such as the wide ribbon with multiple recording lanes or the discs described in the copending Williams application, Serial No. 753,159, filed June 7, 1947, now Patent No. 2,567,092, issued September 4, 1951, also functions remarkably well with the detachable signal elements.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

The principles of the invention explained in connection with specific exemplifications thereof will suggest to those skilled in the art many other applications and modifications of the same. It is accordingly desired that the appended claims be construed broadly and that they shall not be limited to the specific details shown and described in connection with exemplifications thereof.

I claim:

1. In a magnetic transducer device for transducing signals on an elongated permanently magnetizable record track by magnetic flux linkage of successive elements of the record track as they move past a magnetic transducer head, the combination of: guiding and impelling means for guiding and impelling the elongated record track in a guide path past the magnetic transducer head at two different speeds, a plurality of signal means whose electrical conductivity differs from the electrical conductivity of said record track affixed to said record track at spaced apart intervals; sensing means in said guide path responsive to the electrical conductivity of said signal means as they move past and engage said sensing means; and control means including an adjustable counter for counting the number of said signal means passing said sensing means and for controlling the impelling means in accordance therewith to change the speed of said record member from one of said two speeds to the other.

2. In a magnetic record transducer apparatus for transducing signals on an elongated permanently magnetizable record track by magnetic flux linkage of successive elements of the record track as they move past magnetic transducing structure, the combination of: guiding and impelling means for guiding and impelling the elongated record track in a guide path selectively forward or reverse past the magnetic transducing structure at two speeds the lower of which is used during transducing operations and the higher of which is used during location of a section of said record track; a plurality of adherent signal elements affixed to selected portions of the record track and having physical characteristics different from the record track; a sensing structure in the said guide path responsive to the physical characteristics of the said signal elements as they move past the sensing structure in the guide path; automatic control means connected to said sensing structure and connected to said impelling means and including manually adjustable selector mechanism with which the desired region of the record track is selected to automatically impel said record track in the proper forward and reverse direction which brings the selected region of the record track into position for transducing.

OTTO KORNEI.

REFERENCES CITED

The following references are of record in the file of this patent:

UNITED STATES PATENTS

| Number | Name | Date |
|---|---|---|
| 1,223,771 | Day | Apr. 24, 1917 |
| 1,826,786 | Hopkins | Oct. 13, 1931 |
| 1,852,236 | Fenner et al. | Apr. 5, 1932 |
| 1,949,840 | Languepin | Mar. 6, 1934 |
| 2,031,605 | Jenkins et al. | Feb. 25, 1936 |
| 2,038,976 | Wood et al. | Apr. 28, 1936 |
| 2,096,020 | Adair et al. | Oct. 19, 1937 |
| 2,116,314 | Jenkins et al. | May 3, 1938 |
| 2,136,209 | Finch | Nov. 8, 1938 |
| 2,151,629 | Wallis | Mar. 21, 1939 |
| 2,248,293 | Woolf et al. | July 8, 1941 |
| 2,279,119 | Freimann | Apr. 7, 1942 |
| 2,281,943 | Loughner | May 5, 1942 |
| 2,294,854 | Steed | Sept. 1, 1942 |
| 2,295,000 | Morse | Sept. 8, 1942 |
| 2,396,409 | Berzer | Mar. 12, 1946 |
| 2,430,538 | Somers | Nov. 11, 1947 |
| 2,475,439 | Waller et al. | July 5, 1949 |
| 2,514,578 | Heller et al. | July 11, 1950 |

FOREIGN PATENTS

| Number | Country | Date |
|---|---|---|
| 582,383 | Germany | Aug. 14, 1933 |
| 466,023 | Great Britain | May 18, 1937 |
| 544,760 | Great Britain | Apr. 27, 1942 |